INVENTORS
HOWARD R. BAYLIS & JOSEF M. H. TIEFENTHAL
BY
Morgan, Finnegan, Durham & Pine
ATTORNEYS INVENTORS
HOWARD R. BAYLIS & JOSEF M. H. TIEFENTHAL
BY
Morgan, Finnegan, Durham & Pine
ATTORNEYS United States Patent Office 3,511,141
Patented May 12, 1970

3,511,141
PHOTOCOMPOSER MOTOR CONTROL
APPARATUS
Howard Raymond Baylis, East Grinstead, and Josef Maria Herbert Tiefenthal, Reigate, Surrey, England, assignors to The Monotype Corporation Limited, London, England, a British company
Filed Mar. 6, 1967, Ser. No. 620,881
Claims priority, application Great Britain, Mar. 10, 1966, 10,651/66
Int. Cl. B41b 21/36
U.S. Cl. 95—4.5          7 Claims

ABSTRACT OF THE DISCLOSURE

Photocomposing apparatus in which the movement of a mirror pair spaces the image of a master character relative to the film. An electric motor having an output member rotatable in steps move the mirror pair in stepwise fashion. The current through the field coils of the motor are varied in discrete steps between a maximum and a minimum value so that the resultant magnetic field and hence the rotor rotate in discrete angular steps.

---

The invention relates to control apparatus utilized within a photocomposing device.

The invention provides control apparatus for an electric motor having an output member movable in discrete steps between various positions and a plurality of electric current carrying systems through which current may be selectively passed to generate an electromagnetic force to act on the movable output member so that the position of the output member depends on the selected current in the various current carrying systems, which control apparatus comprises connecting means for selectively connecting a supply of electric current to the said current carrying systems and means for varying the magnitude of the current in at least one of the current carrying systems in discrete steps between a minimum and a maximum current value. Preferably the minimum current value is zero.

Preferably the position of the output member is arranged to vary in dependence on the direction of the resultant magnetic field produced by at least two current carrying systems whereby when the magnitude of the current in at least one of the systems is varied in discrete steps to alter the direction of the said resultant magnetic field, the position of the output member is also varied in discrete steps.

Preferably at least four current carrying systems are provided forming two pairs so that the two systems in each pair are arranged to provide fields of opposite polarity.

Preferably the apparatus includes means for producing a number of electrical pulses corresponding to a required change in position of the said output member and the said connecting means and means for varying the magnitude of the current are arranged to control the current in said current carrying systems so that the current is dependent on the said number of pulses.

Preferably counting means is provided for counting the number of electrical pulses and the said connecting means and means for varying the magnitude of the current include switches which are operated by the output of said counting means.

Preferably the means for varying the magnitude of the current include a plurality of resistors selectively connectable between the supply of electric current and one or more of the current carrying systems.

Preferably the connecting means is arranged to supply electric current to only one current carrying system of each pair at any given time and preferably as the current in one system of one pair is increased in steps from zero to a maximum value, the current in one system of the other pair is decreased in steps from a maximum value to zero.

Preferably the means for varying the magnitude of the current includes two sets of resistors each set being selectively connectable between one or other of the current carrying systems of each pair and the supply of electric current, and the switches operated by the counting means are arranged to increase the effective resistance of one set in steps as the effective resistance of the other set is reduced in steps.

The invention also provides photocomposing apparatus for composing a line or lines of print, which apparatus comprises a plurality of selectable master characters, a light sensitive recording member, means for projecting optically images of a succession of selected master characters onto the light sensitive recording member and means for effecting relative movement between the projected images and the recording member so that successive images incident on the recording member may be spaced apart along a line, which means for effecting relative movement includes an electric motor having an output member movable in discrete steps and control apparatus as aforesaid for controlling the movement of the said output member.

One embodiment of the invention will now be described by way of example and with reference to the accompanying drawings in which.

Figure 1:
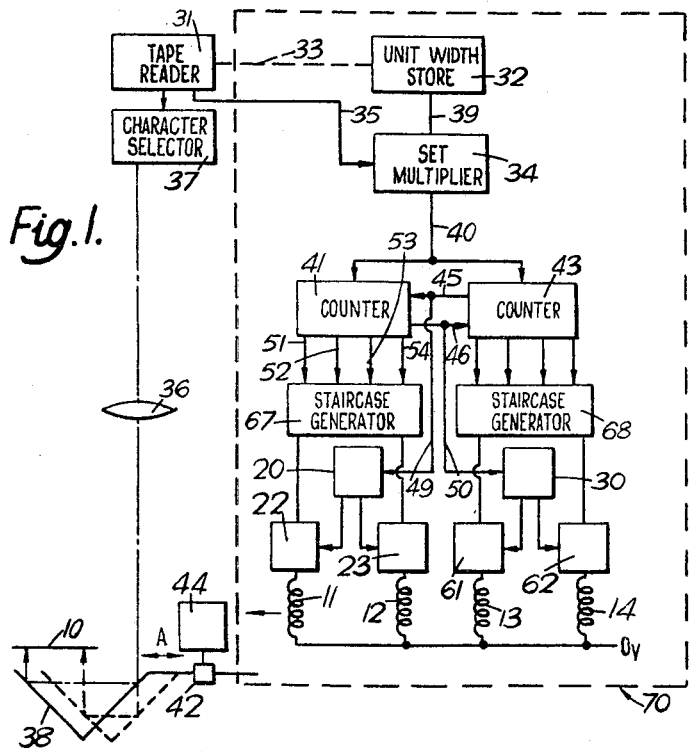
FIG. 1 shows a block diagram of a photocomposing apparatus.

The apparatus, in the example, of FIGS. 1 to 4 consists of a photocomposing machine including a tape reader 31 into which is fed a paper or magnetic tape carrying the necessary signals, such as the character to be selected, the type size and the spacing required for justification, for controlling the operation of the machine in composing justified lines of print. The signals are previously recorded on the tape in a keyboard machine. In the case of paper tape the signals may comprise holes punched in the tape in accordance with a predetermined code in which the position of holes in a line across the tape correspond to the information required. Similarly with a magnetic tape the positions of the signals recorded magntically on the tape may correspond to the information required. The machine is controlled so that the master character selected from the master character carrier or matrix disc is moved by the character selector 37 to a position from which it may be illuminated, by a flash source of light and the transmitted image of this character is projected through an optical system, comprising a focusing and magnifying lens system 36 and two right angled mirrors 38, for reflectinng the image through 180° onto a photographic film 10. The mirrors 38 may be moved, by a stepping motor 44 driving a rack and pinion 42, in the direction of the arrow A in FIG. 1, so that the image of the master character moves along the direction of the line of exposed images on the film 10. The motor 44 is controlled by a controllable mechanism, shown generally at 70, which itself receives input signals from the tape-reader 31. The extent of movement by the motor 44 is governed by the character selected, the required spacing for justification and the type size. The magnification of the lens system 36 may be varied and is controlled by those signals on the tape which represent the type size.

The controlling mechanism 70 includes a unit width store 32 connected to the tape-reader 31 by a line 33, and a set multiplier 34 connected to the tape reader 31 by a line 35.

The unit width store 32 is connected to the set multiplier 34 by a line 39 and the output of the set multiplier 34 is connected by a line 40 to two similar counters 41 and 43 these counters being interconnected by lines 45 and 46. Four outputs 51, 52, 53 and 54 from the counter 41 control four electronic switches 24, 25, 26, 27 shown in FIG. 2, similarly four outputs from the counter 43 control a further four electronic switches. The switches 24, 25, 26 and 27 are connected in series to the resistances 16, 17, 18 and 19 respectively (which have the resistance values 80 ohms, 40 ohms, 20 ohms and 10 ohms respectively) all of these switch and resistance pairs being connected in parallel between lines 47 and 48. The switches 24 to 27 and resistances 16 to 19 form a staircase generator 67. Line 48 is connected via switches 22 and 23 to either of field coils 11 and 12 respectively of the bifilar motor 44, a flip-flop 20 closing alternately one of the switches 22 or 23. The flip-flop 20 is connected to counter 43 by line 49. The ends of the field coils 11 and 12 remote from the switches 22 and 23 are connected to a common line 59 and a D.C. electrical supply is connected between lines 47 and 59. Coils 13 and 14 are similarly connected via two switches 61 and 62 controlled by a flip-flop 30 to another staircase generator 68 similar to the staircase generator 67.

In operation, the signal for the required character is passed through line 33 to the unit width store 32 which has a "memory" containing details of the relative widths of all of the characters to be used in the photocomposing machine. The unit width store passes along the line 39 to the set multiplier 34 a signal consisting of a number of pulses corresponding to the relative width of the character selected.

A signal indicating the required point size for the selected character is fed from the tape reader 31 to the set multiplier 34 via line 35 where it causes the set multiplier to multiply the number of pulses in the signal received on line 39 so that the signal leaving the multiplier 34 along the line 40 contains a number of pulses which denotes the next required movement of the mirror 38 to effect the necessary spacing between adjacent characters in view of the particular character selected and its point size. The counters 41 and 43 are binary type counters and count the pulses in the line 40 and operate the switches 24 to 27 in the staircase generator 67, and similar switches in the staircase generator 68, so that the switches become open or closed depending upon the number of pulses counted, from the previous condition of the switch combination as shown in the following table where 0 denotes an open switch and 1 denotes a closed switch.

| Number of input pulses to counter | Switches | | | |
|---|---|---|---|---|
| | 24 | 25 | 26 | 27 |
| 0 | 0 | 0 | 0 | 0 |
| 1 | 1 | 0 | 0 | 0 |
| 2 | 0 | 1 | 0 | 0 |
| 3 | 1 | 1 | 0 | 0 |
| 4 | 0 | 0 | 1 | 0 |
| 5 | 1 | 0 | 1 | 0 |
| 6 | 0 | 1 | 1 | 0 |
| 7 | 1 | 1 | 1 | 0 |
| 8 | 0 | 0 | 0 | 1 |
| 9 | 1 | 0 | 0 | 1 |
| 10 | 0 | 1 | 0 | 1 |
| 11 | 1 | 1 | 0 | 1 |
| 12 | 0 | 0 | 1 | 1 |
| 13 | 1 | 0 | 1 | 1 |
| 14 | 0 | 1 | 1 | 1 |
| 15 | 1 | 1 | 1 | 1 |

There are fifteen different combinations of positions of switches 24, 25, 26, 27 (excluding all open) each one of the fifteen corresponding to particular numbers of pulses counted by the counter 41. It will be appreciated that the above table shows the effect of only the first fifteen pulses counted by one of the counters. In practice however the counters will normally count continuously as photocomposing proceeds along a line of print, thereby acting as cumulative adding devices. The switch pattern shown in the above table will be repeated after every thirty pulses counted by the associated counter. The flip-flop 20 opens one or other of the switches 22 or 23 and so controls which coil 11 or 12 is to be switched into the D.C. circuit between lines 47 and 59. The combination of switches determines which of the resistances 16, 17, 18 and 19 are connected between lines 47 and 48 and hence the current which flows through the coil selected by the flip-flop depends upon the number of pulses in the input signal on the line 40 and the previous condition of the switch combination.

Consider the case in which the counter 41 registers zero, and the flip-flop 20 has closed switch 22 and opened switch 23. At the same time counter 43 registers fifteen and the flip-flop 30 has closed the switch 62 and opened the switch 61. This is the case at the beginning of the graph in FIG. 3.

Figure 3:
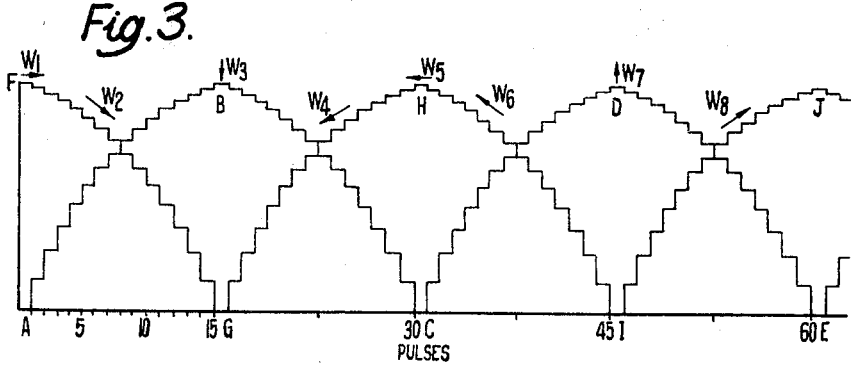
FIG. 3 shows the circuit pulse characteristic of the part of the apparatus shown in FIG. 2.

The resistances 16, 17, 18, 19 and switches 24, 25, 26, 27 are arranged so that the current through the coil 11 increases from zero to a maximum in discrete steps as shown in FIG. 3 from A to B, as the counter 41 counts from zero to fifteen. At the same time the counter 43 counts down from fifteen to zero and the current in coil 14 decreases in discrete steps from a maximum to a minimum as shown in FIG. 3 from F to G.

When the counter 41 counts the fifteenth pulse (from zero) it emits a pulse along line 46 which resets the counter 43 to zero and also emits a pulse along line 50 which switches over the flip-flop 30 to connect up coil 13 and disconnect coil 14.

Both counters 41 and 43 are reversible and reverse their counting when they reach fifteen and zero.

The following fifteen pulses then act on the counter 43 and staircase generator 68 to cause the current in coil 13 to increase from zero to a maximum as shown in G to H in FIG. 3, and on counter 41 and staircase generator 67 to cause the current in coil 11 to decrease as shown by B to C in FIG. 3.

At the end of thirty pulses the counter 43 emits a pulse along lines 45 and 49. The pulse on line 45 resets the counter 41 to zero and the pulse on line 49 changes the flip-flop 20 to connect up the coil 12 and disconnect the coil 11. As more pulses are counted, the currents in the motor coils continue to increase and decrease in discrete steps in a generally similar way and as shown in FIG. 3. FIG. 3 shows one complete cycle corresponding to sixty pulses. However, the counting process is cyclic and the current pattern shown in FIG. 3 will be repeated every sixty pulses.

Figure 4:
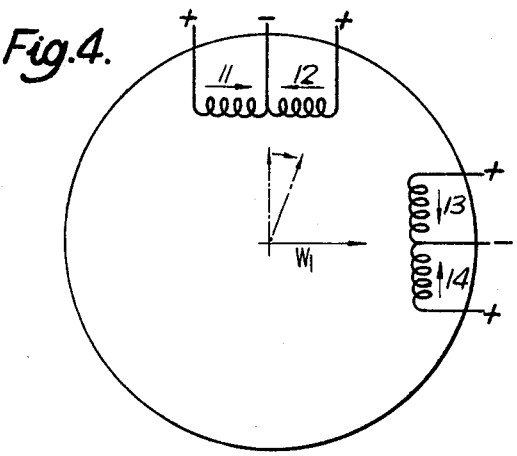
FIG. 4 shows diagrammatically part of a stepping motor.

The effect of the varying current in the field coils may be seen with reference to FIGS. 3 and 4. The coils 11 and 12 are wound on adjacent parts of the motor stator and have opposite polarities. The coils 13 and 14, having opposite polarities, are also wound adjacent each other but on a part of the stator 90° electrically removed from the coils 11 and 12. The output members of the motor is attached to a magnetised rotor which adopts a rotational position dependent on the direction of the resultant magnetic field of the coils 11, 12, 13 and 14. (That is the rotor adopts a position dependent on the vector sum of the forces caused by the coils. The change in direction of the rotor as the current in the coils 11 to 14 changes is shown in FIG. 3. When the current in coil 14 is a maximum and the current in coil 11 a minimum, the rotor lies along the direction of the arrow W1 in FIGS. 3 and 4. As the current in coil 11 increases and the current in coil 14 decreases, the rotor moves clockwise until when fifteen pulses have been counted by the counter 41, the rotor has moved through 90° electrically (covering 15 discrete possible rotor positions) to the direction of the arrow W3 in FIG. 3. As more pulses are counted by the counters 41 and 43, the position of the rotor continues to rotate clockwise through the various directions W3 to W8 as shown in FIG. 3. It will therefore be seen that the output member may move in discrete steps between different positions depending on the number of pulses counted by the counters 41 and 43. In this way, the mirror pair 38 is moved in discrete steps by the rack and pinion 42 in response to the change in rotational position of the output member of the motor; thereby to provide the required spacing between adjacent characters on the film 10. The mirror pair is similarly caused to move in response to a pulse signal fed to the motor to effect the necessary spacing, corrected for justification, between adjacent words.

On completion of each line of characters on the film 10, the mirror pair 38 is moved by the motor 44 back to the beginning of the line. This is effected by a signal on the tape 31 causing the motor 44 to reverse direction and a continuous stream of pulses is fed to the motor. When the mirror pair 38 has returned to the beginning of a line, a switch is operated to discontinue the supply of pulses to the motor 44 and reverse its direction of rotation. The film is then moved by a film feed device perpendicular to the line of characters to present the next line on the film for exposure.

In the preferred embodiment above, the position of the rotor may lag, for example during starting, or lead by up to thirty pulses before coming so far out of step that it cannot regain its correct position under steady conditions.

Figure 5:
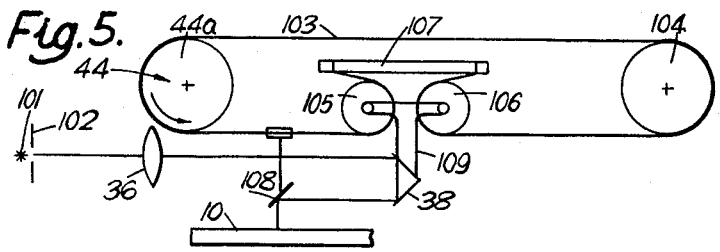
FIG. 5 shows an alternative output arrangement from the stepping motor.

FIG. 5 shows diagrammatically an alternative way of connecting the stepping motor 44 to the mirror pair 38 to cause movement of successive character images along a line on the film 10. The photocomposing apparatus is generally similar to that of FIG. 1 and includes a light source 101 arranged to shine light through the master character carrier 102 so that the image of the selected character passes through the lens 36 and is reflected by the mirror pair 38 before reaching the photographic film 10. In this case, the stepping motor 44 has an output pulley 44a over which passes a flexible steel band 103. The steel band 103 passes around a fixed idler pulley 104, around two movable pulleys 105, 106, and has its two ends fixed to a movable rigid member 107. The mirror pair 38 is mounted on a carriage 109 fixed to the two pulleys 105 and 106 so as to move with them along the optical axis of the photocomposing machine. A further mirror 108 is mounted on the steel band 103 between the pulleys 44a and 105 and is arranged to reflect light from the mirror pair 38 onto the film 10. When the motor 44 revolves, the steel band 103 moves with rotation of the pulley 44a and the mirror 108 is moved along the film 10 the same amount as the periphery of pulley 44a moves. The mirror pair 38 is moved in the same direction as the mirror 108 but only half as far. In this way, the length of optical path between the lens 36 and film 10 remains constant as the mirror 108 and mirror pair 38 are moved. This avoids the need for adjusting lens 36 as the character images are moved progressively along the film 10.

Figure 6:
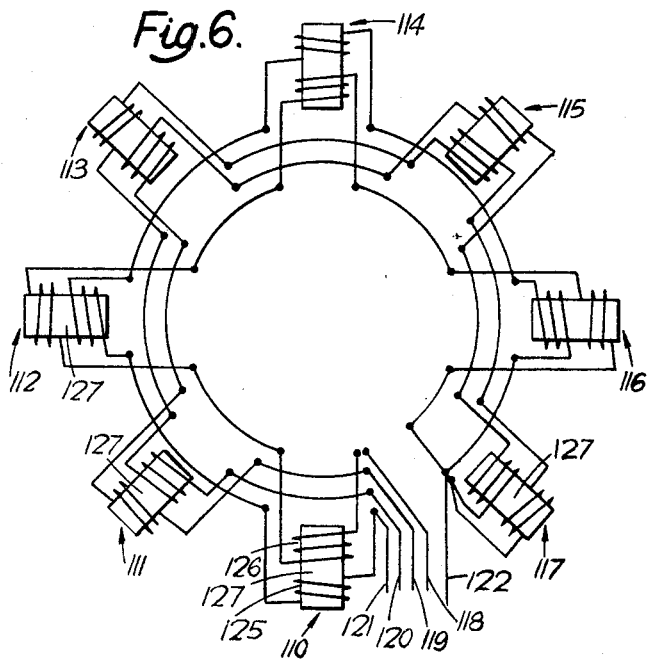
FIGS. 6 and 7 show more fully a practical arrangement of part of the stepping motor.
Figure 7:
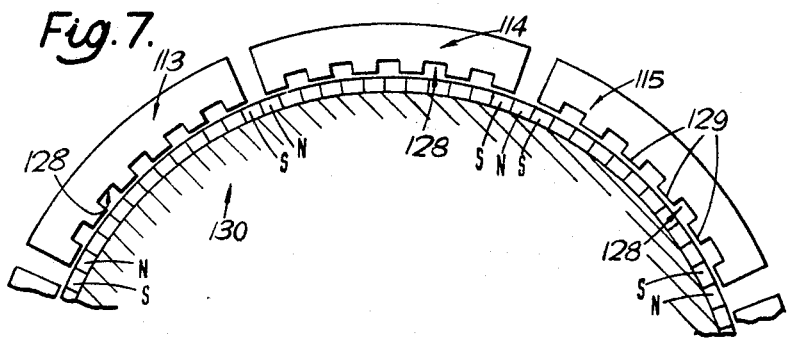

FIG. 6 and 7 show diagrammatically fuller details of a practical motor such as the motor 44 of FIGS. 1 and 4. FIG. 6 shows the stator windings and FIG. 7 shows part of the rotor 130 and part of the stator. The stator has eight poles 110 to 117 and each pole has two windings, wound in opposite directions so as to be of opposite polarity, such as the windings 125 and 126 shown for pole 110. The windings of each stator pole are wound on a core 127 which has a pole face 128 as shown in FIG. 7 provided with six teeth 129. The stator thus has forty-eight equally spaced teeth disposed around a circle. The rotor 130 fits closely inside the stator pole faces 128 and is a permanent magnet, magnetised along its axis, on which is mounted two fifty-tooth segments, one at each end, offset relative to each other by one tooth width. In this way, the rotor 130 has 100 teeth which are alternately north and south poles (N and S respectively) as shown in FIG. 7, all the north poles being at one axial end of the rotor and all the south poles at the other end. The input leads 118 to 121 to the stator windings are connected as shown in FIG. 6 and an input is applied to selected pairs of the leads 118 to 121. Lead 122 is a common output lead. When equal inputs are applied to leads 120 and 118, pole 113 is a north pole and poles 114 and 115 are south poles. The rotor then takes up the position shown in FIG. 7.

After a series of pulses changing the current values by control means 70 the inputs will arrive at a step where the currents are again equally divided, but between coils 120 and 121. Pole 113 remains a north pole and pole 115 remains a south pole but pole 114 becomes a north pole. This causes the rotor 130 to rotate by one-half tooth position clockwise (that is 1/200 of a revolution). In FIG. 6 a plurality of windings connected in series replace each of the simple windings 11 to 14 of FIG. 4. For instance, where in FIG. 4, current flows in windings 11 or 12, in FIG. 6 current flows to leads 118 or 121 from the control mechanism 70. Similarly wherein FIG. 4 current flows in winding 13 or 14, in FIG. 6 current flows to leads 119 or 120.

The direction of rotation of the rotor 130 may be reversed by reversing the sequence of switching inputs to the leads 118 to 121. Four successive switchings of the inputs (i.e. inputs applied to leads 120, 118 changed to leads 120, 121, changed to leads 119, 121, changed to leads 119, 118) constitute one electrical cycle and fifty electrical cycles cause one complete revolution of the rotor 130.

In the above described examples the use of gear changes with change of point size is avoided. The machine operates at a very high speed and has relatively low bulk and weight. A high ratio reduction is achieved in the stepping motor so that the use of reduction gears with consequent backlash inaccuracies, is avoided.

The invention is not restricted to the details of the foregoing examples. For instance the unit width store may include a tape memory or derive information concerning the character width from one or more additional holes on the matrix disc.

This type of drive has many other applications besides the placement of characters on film for phototype composition. It may be used for any scalar drive where the position of a driven member must be set to a numerical value however fine the units. Typically the motor could be coupled to the lead screw of a machine tool in order to operate the machine under numerical control techniques.

The film feed device for moving the film on line by line, perpendicular to the lines, when each line of characters is completed, may use a stepping motor and control apparatus generally similar to the motor 44 and control device 70 described above.

Figure 2:
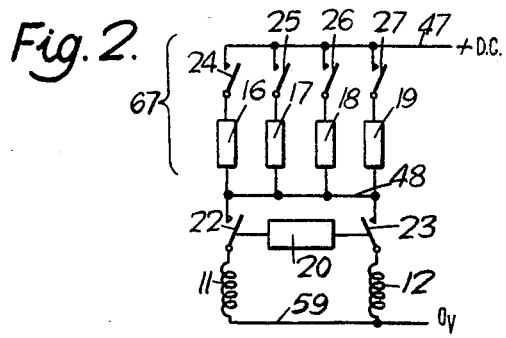
FIG. 2 shows in more detail part of the apparatus of FIG. 1.

The staircase generators 67 and 68 may each have more or less than the four resistors and associated switches shown in FIG. 2 thereby providing a different number of current levels.

We claim:
1. Photocomposing apparatus for composing a line, or lines, of print, comprising:
   a plurality of selectable master characters;
   a light sensitive recording member;
   projection means for projecting optically images of a succession of selected master characters onto said light sensitive recording member; and
   spacing means for effecting relative movement between said projected images and said recording member so that successive images incident on said recording member may be spaced apart along a line,
said spacing means including
an electric motor having a rotor movable in discrete steps between various positions and a plurality of motor windings through which current may be selectively passed to generate an electromagnetic force to move the rotor to a corresponding position, and
a staircase current generator for varying the current in the motor windings in discrete steps between a minimum and a maximum current value.

2. Photocomposing apparatus as defined in claim 1, including
an information store for indicating the width of each character being composed, and
pulse generating means for generating a number of electrical pulses corresponding to the space to be allocated on the recording member between adjacent character images, said staircase generator being connected to said pulse generating means so that the current is varied in dependence on the number of pulses generated.

3. Photocomposing apparatus as defined in claim 2, wherein the staircase current waveform generator comprises a plurality of resistors and associated switch devices arranged to vary the current in steps between a maximum and minimum value so as to generate a cyclical staircase waveform.

4. Photocomposing apparatus as defined in claim 3, wherein a binary counter is provided for counting the number of electrical pulses, one resistor of the staircase generator is provided for each binary output of the counter, and one switch device is connected to to each binary output of the counter so that the resistors are switched in or out in binary coded fashion.

5. Photocomposing apparatus as defined in claim 4, wherein two adjacent motor windings of opposite polarity are connected to said staircase generator and switch means is provided for connecting current to one of said two windings during one part of the staircase cycle and to the other of said two windings during another part of the staircase cycle.

6. Photocomposing apparatus as defined in claim 5, including at least two sets motor of motor windings spaced apart, and two staircase generators of different phase, one set of windings being connected to one of said generators and the other set of windings being connected to the other of said generators.

7. Photocomposing apparatus as defined in claim 1, wherein said electric motor has a stator and rotor, each of said stator and rotor having tooth-shaped pole pieces.

References Cited

UNITED STATES PATENTS

| | | | |
|---|---|---|---|
| 2,388,961 | 11/1945 | Elliott | 95—4.5 |
| 2,670,665 | 3/1954 | Caldwell | 95—4.5 |
| 3,183,806 | 5/1965 | O'Brien | 95—4.5 |
| 3,336,849 | 8/1967 | Broglio | 95—4.5 |
| 3,357,327 | 12/1967 | Proud | 95—4.5 |

JOHN M. HORAN, Primary Examiner